(12) United States Patent
Sathyanarayana et al.

(10) Patent No.: US 10,972,515 B2
(45) Date of Patent: Apr. 6, 2021

(54) SERVER ASSISTED LIVE STREAM FAILOVER

(71) Applicant: Verizon Digital Media Services Inc., Dulles, VA (US)

(72) Inventors: Karthik Sathyanarayana, Los Angeles, CA (US); Seungyeob Choi, Northridge, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 330 days.

(21) Appl. No.: 15/664,341

(22) Filed: Jul. 31, 2017

(65) Prior Publication Data

US 2019/0036986 A1 Jan. 31, 2019

(51) Int. Cl.
*H04L 29/06* (2006.01)
*H04L 12/24* (2006.01)
*H04L 29/08* (2006.01)

(52) U.S. Cl.
CPC ...... *H04L 65/1083* (2013.01); *H04L 41/0668* (2013.01); *H04L 65/4084* (2013.01); *H04L 65/602* (2013.01); *H04L 65/608* (2013.01); *H04L 67/02* (2013.01)

(58) Field of Classification Search
CPC ............. H04L 65/1083; H04L 41/0668; H04L 65/4048; H04L 65/602; H04L 65/608; H04L 67/02
USPC ........................................................ 709/219
See application file for complete search history.

(56) References Cited

U.S. PATENT DOCUMENTS

| | | | |
|---|---|---|---|
| 2010/0042724 A1* | 2/2010 | Jeon | H04L 29/12066 709/226 |
| 2010/0299722 A1* | 11/2010 | Tewari | H04L 67/101 726/3 |
| 2011/0083037 A1* | 4/2011 | Bocharov | H04N 21/23116 714/4.11 |
| 2013/0332782 A1* | 12/2013 | Christena | G06F 11/32 714/57 |
| 2014/0143590 A1* | 5/2014 | Bagga | H04N 21/8456 714/4.11 |
| 2014/0222962 A1* | 8/2014 | Mao | H04N 21/4305 709/219 |
| 2014/0222984 A1* | 8/2014 | Varney | H04L 41/0893 709/223 |
| 2014/0337461 A1* | 11/2014 | Lipstone | H04L 41/12 709/213 |

(Continued)

*Primary Examiner* — Umar Cheema
*Assistant Examiner* — Tony Williams
(74) *Attorney, Agent, or Firm* — Ansari Katiraei LLP; Arman Katiraei; Sadiq Ansari (57) ABSTRACT

Server assisted live stream failover involves detecting a manifest of a stream provided by a first source exceeding a staleness quotient before the stream ends, and initiating or triggering failover of the stream from the first source to a second source in response to detecting the stale manifest. A server initiates the failover on behalf of a client, wherein the client requests objects (i.e., manifests and segments) of the stream, the server distributes those objects from at least the first source to the client, and the server detects that a particular requested object has become stale past a staleness quotient. The server indirectly redirects a client from a first source to a second source by passing a message with a 4xx or 5xx code to the client in place of a message with a 3xx code provided by the first source.

16 Claims, 7 Drawing Sheets

(56) References Cited

U.S. PATENT DOCUMENTS

| | | | |
|---|---|---|---|
| 2014/0359081 A1* | 12/2014 | Van Deventer | H04N 21/6587 709/219 |
| 2015/0058403 A1* | 2/2015 | He | H04L 67/32 709/203 |
| 2015/0088964 A1* | 3/2015 | Shiell | H04L 67/2852 709/203 |
| 2015/0215359 A1* | 7/2015 | Bao | H04L 65/605 709/219 |
| 2017/0339437 A1* | 11/2017 | Lee | H04N 21/2383 |

\* cited by examiner

```
#EXTM3U
#EXT-X-VERSION:3
#EXT-X-INDEPENDENT-SEGMENTS

#EXT-X-STREAM-INF:BANDWIDTH=655600,AVERAGE-
BANDWIDTH=655600,CODECS="avc1.42c01f,mp4a.40.2",RESOLUTION=640x360,FRAME-RATE=25.000
http://hostname-cdn/origin1/path/to/manifest/rendition1.m3u8
                                                              ⟍ 110
#EXT-X-STREAM-INF:BANDWIDTH=655600,AVERAGE-
BANDWIDTH=655600,CODECS="avc1.42c01f,mp4a.40.2",RESOLUTION=640x360,FRAME-RATE=25.000
http://hostname-cdn/origin2/path/to/manifest/rendition1.m3u8
                                                              ⟍ 120
```

SERVER ASSISTED LIVE STREAM FAILOVER

BACKGROUND ART

Live streaming is the transmission of media content over a digital network, such as the Internet, to different network enabled clients (e.g., computers, tablets, smartphones, set-top boxes, etc.). Encoders encode the media content as a set of segments and upload the segments to at least one storage source with each segment representing a short duration of the overall stream. One or more servers then perform a serialized delivery of the segments from the at least one storage source to clients that request the individual segments. Clients are made aware of the segments with one or more stream manifests that are also generated by the encoders and uploaded to the at least one storage source. The one or more stream manifests provide the names or links for some set of segments that the clients can request and retrieve. The segments and manifests therefore comprise the objects of the media stream.

According to some streaming protocols, the encoders regularly generate and upload updated manifests to the at least one storage source. Each updated manifest provides the names or links for some set of stream segments that are available for distribution at a corresponding time. In other words, the manifest is repeatedly updated as the media stream encoder encodes the next set of segments of the live stream. In order to playback the live stream, clients repeatedly request and retrieve the updated manifests in order to identify and request the next set of live stream segments for playback.

Figure 1:
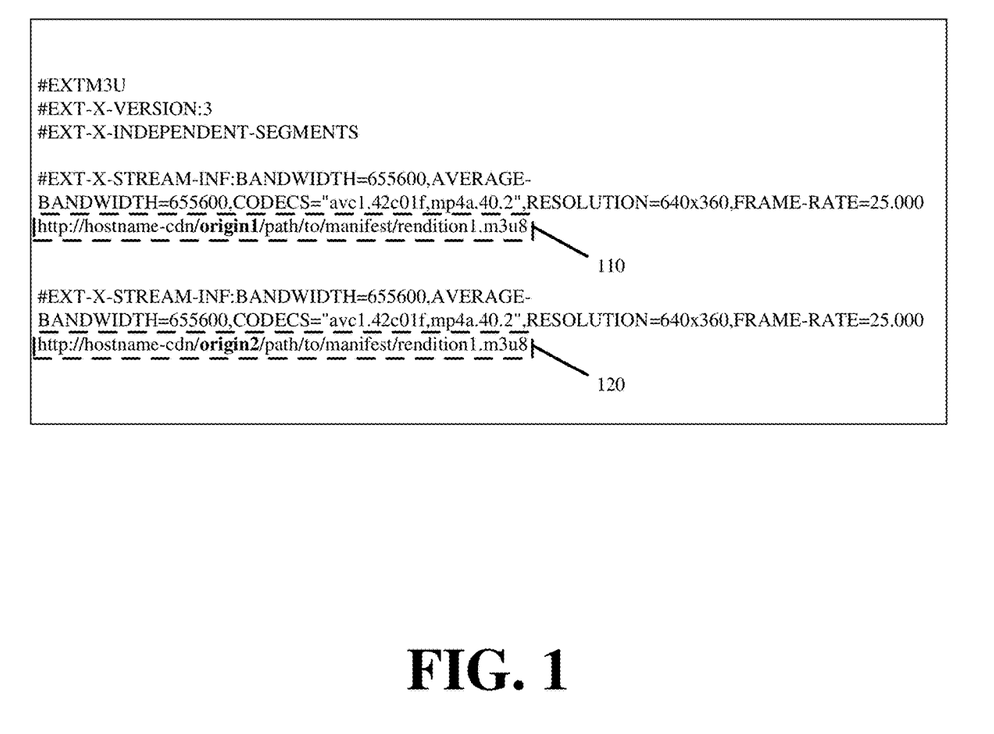
FIG. 1 conceptually illustrates a manifest based on the HTTP Live Streaming (HLS) specification, with links to different sources where the updated manifests and segments are published and made available for retrieval.

For failover or redundancy purposes, the objects of a particular media stream (i.e., manifests and segments) may be simultaneously or contemporaneously uploaded to two different sources. Clients may be made aware of the redundant sources through the manifests. In particular, the manifests can be populated with links to the two or more sources from which the clients can request and access updated manifests and segments of a media stream. Accordingly, if one source is overloaded, fails, or becomes inaccessible, clients can switch to the second source and resume playback of the same stream. FIG. 1 conceptually illustrates a manifest based on the HTTP Live Streaming (HLS) specification, with links 110 and 120 to different sources where the updated manifests and segments are published and made available for retrieval.

Clients failover from one source to the next in response to requesting a manifest or segment, and receiving an error message in reply. The error messages are typically Hyper-Text Transfer Protocol (HTTP) messages with a 4xx or 5xx error code (e.g., 404 Not Found, 408 Request Timeout, 500 Internal Server Error, 504 Gateway Timeout, etc.).

The source does not however send an error message in response to a client request for a manifest that has not been updated for some period of time or that has not been updated since the last client request. In such cases, the source responds with a stale message rather than the error message. The stale message is an HTTP message with a 3xx status code. In most instances, the stale message includes a 304 Not Modified status code.

The manifest may become stale at a particular source as a result of the client advancing ahead of the encoder generating the manifests and live stream segments. In other words, the client requests a manifest from the particular source before the encoder has updated the manifest to that particular source. This is not an error. Accordingly, the stale message is sent instead of the error message. In response to the stale message, the client retries its request at a later time by sending the same request to the same particular source.

The manifest can also become stale if the encoder is unable to update the particular source as a result of network connectivity issues, issues experienced by the encoder, or issues experienced by the particular source that prevent the encoder from publishing to the particular source. These issues may be temporary in which case the stale message remains the appropriate response. If, however, the issues persist, the stale message improperly signals the client to continue requesting from the particular source even though the particular source is unable to receive updates from the encoder while remaining accessible by the client. The continual retrying of the same particular source by the client in response to the stale message causes the client to miss several seconds of the live stream or completely lose access to the live stream even though updated manifests and segments of the stream may be accessible from a different source.

There is therefore a need to detect manifests that become stale due to persistent issues that prevent the updating of the manifests for an extended period of time. There is further a need to provide failover in the event that a stale manifest is the result of such issues. The failover should not occur too early, whereby clients continually switch between different sources in case of temporary or non-persistent issues affecting playback performance. The failover should also not occur too late such that the client buffer is exhausted and the playback of the media stream is interrupted for a significant amount of time before failing over from one source to another.

BRIEF DESCRIPTION OF THE DRAWINGS

A preferred embodiment for server assisted live stream failover will now be described, by way of example only, with reference to the accompanying drawings in which.

DETAILED DESCRIPTION

Disclosed are systems and methods for server assisted live stream failover. The server assisted live stream failover of some embodiments involves a stream distribution server initiating or triggering failover of a particular live stream from a first source to a second source in response to a manifest of the particular live stream provided by the first source becoming stale before the particular live stream ends, wherein the manifest becomes stale when the last update to the manifest was more than a threshold amount of time, and wherein the threshold amount of time is defined by a configurable staleness quotient.

In some embodiments, the server initiates the failover on behalf of a client, wherein the client requests objects (i.e., manifests and segments) of the particular live stream, the server distributes those objects from at least the first source to the client, and the server detects that a particular requested object is for a manifest that has become stale past the configurable staleness quotient. The server initiates the failover by indirectly or directly redirecting the client from the first source to the second source. In some embodiments, the server indirectly redirects clients by converting a stale message issued by the first source to an error message in response to detecting staleness of the manifest exceeding the staleness quotient, and passing the error message to the requesting client in place of the stale manifest or the stale message. The error message contains an error code that triggers the client to request objects of the particular live stream from the second source instead of the first source.

The staleness quotient prevents premature failover from one source to another when the manifest staleness is due to early issued client requests or a short-term updating issue. The staleness quotient does however initiate or trigger the failover before the client experiences a significant interruption in the playback of the particular live stream. In some embodiments, the staleness quotient is configured according to an anticipated number of segments that the client buffers ahead of its current playback position. As a result, playback of the particular live stream can continue on the client based on the buffered segments as the server detects the stale manifest and initiates the failover of the particular live stream to a different source.

Figure 2:
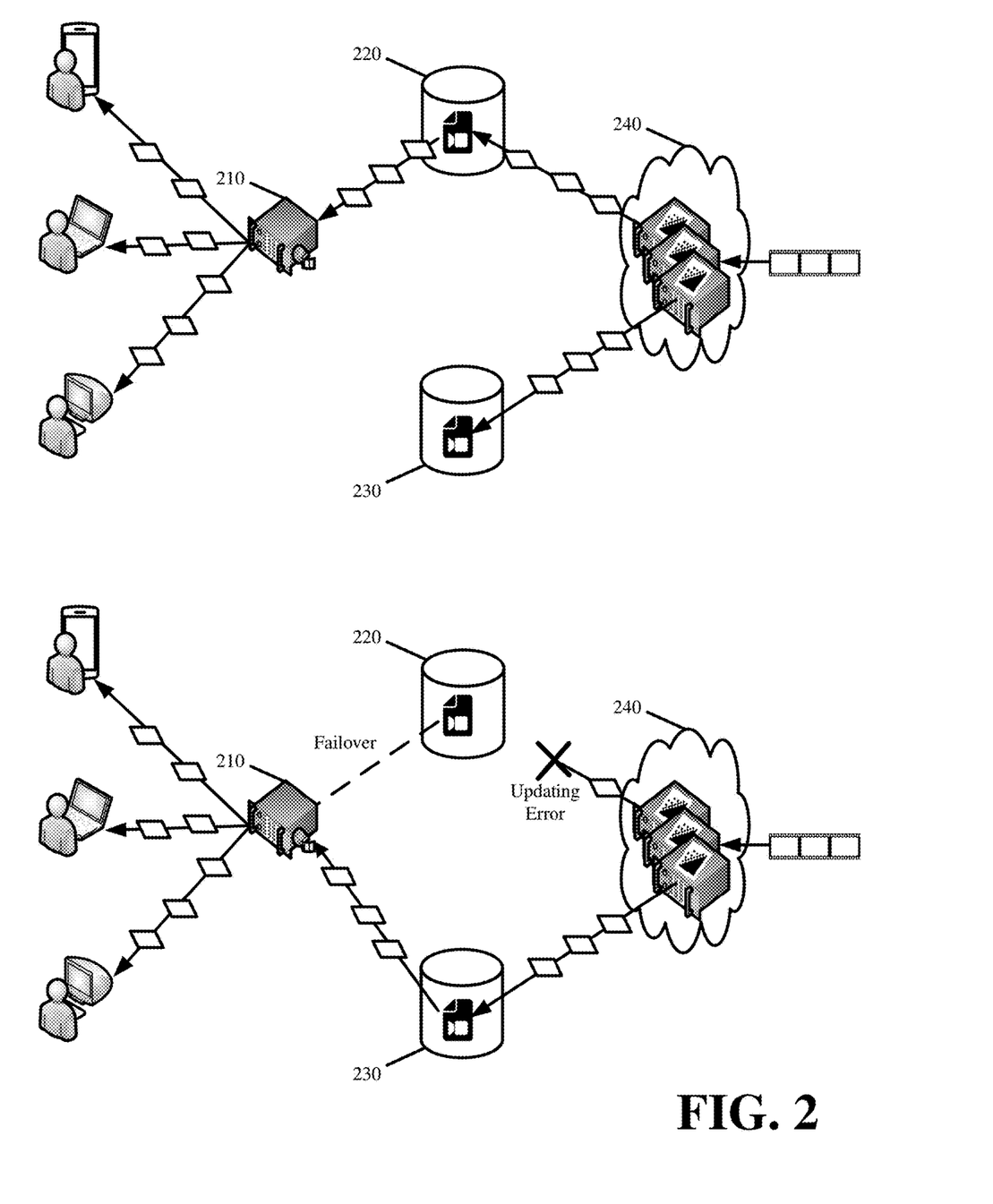
FIG. 2 conceptually illustrates an architecture for implementing server assisted live stream failover in accordance with some embodiments.

FIG. 2 conceptually illustrates an architecture for implementing server assisted live stream failover in accordance with some embodiments. The architecture includes an intermediary server 210, first and second sources 220 and 230, and at least one encoder 240.

The at least one encoder 240 encodes and publishes objects of one or more live streams to the first and second sources 220 and 230. In this figure, the at least one encoder 240 generates the segments of a particular live stream and the one or more manifests enumerating the segments of that particular live stream, and periodically uploads the generated manifests and the corresponding segments identified therein to one or more of the first and second sources 220 and 230. The encoder 240 may represent two or more physical encoders with a first encoder publishing objects of the particular live stream to the first source 220 and with a second encoder simultaneously publishing objects of the particular live stream to the second source 230 in a synchronized manner.

The first and second sources 220 and 230 are redundant storage servers that serve as origin distribution points (i.e., origin sources) for objects of the particular live stream. Thus, if one of the sources fails or cannot receive manifests or segments of the particular live stream, the objects of the particular live stream can still be published to and accessed from the other source.

As shown, the intermediary server 210 initially distributes the objects of the particular live stream from the first source 220 to several clients. At some point, the intermediary server 210 fails over (for any of a variety of reasons) from the first source 220 to the second source 230. The intermediary server 210 then resumes distribution of the subsequent particular live stream objects to the several clients from the second source 230 after completing the fail over.

In the exemplary architecture of FIG. 2, the clients do not directly request the manifests and segments of the particular live stream from the first source 220 or the second source 230. Instead, the requests from the clients first pass to the intermediary server 210. The intermediary server 210 responds to the requests by retrieving requested manifests or stream segments from the first or second sources 220 and 230 and fanning out the manifests or stream segments to the requesting clients. Each manifest or segment retrieved by the intermediary server 210 in response to a particular client request can be cached and used in responding to requests from other clients for the same manifest or segment. By caching and redistributing the particular live stream objects, the intermediary server 210 is able to greatly reduce the load on either source 220 or 230 by reducing the number of requests that the sources 220 or 230 receive.

The intermediary server 210 is typically one of several stream distribution servers operating as part of a collective distributed platform. The stream distribution servers respond to requests from different sets of clients. In some embodiments, each stream distribution server of the distributed platform responds to requests and serves manifests and stream segments to a set of clients operating from a common geographic region or address space. The distributed platform can offload distribution of several live streams from several different stream providers. In other words, the intermediary server 210 can retrieve and distribute manifests and segments of the particular live stream from the first and second sources 220 and 230 while also retrieving and distributing manifests and segments of a different live stream published by a different stream provider from at least a different third source. A content delivery network, cloud service provider, and hosting provider are examples of different distributed platforms that include the intermediary server 210 performing the server assisted live stream failover in accordance with some embodiments.

Figure 3:
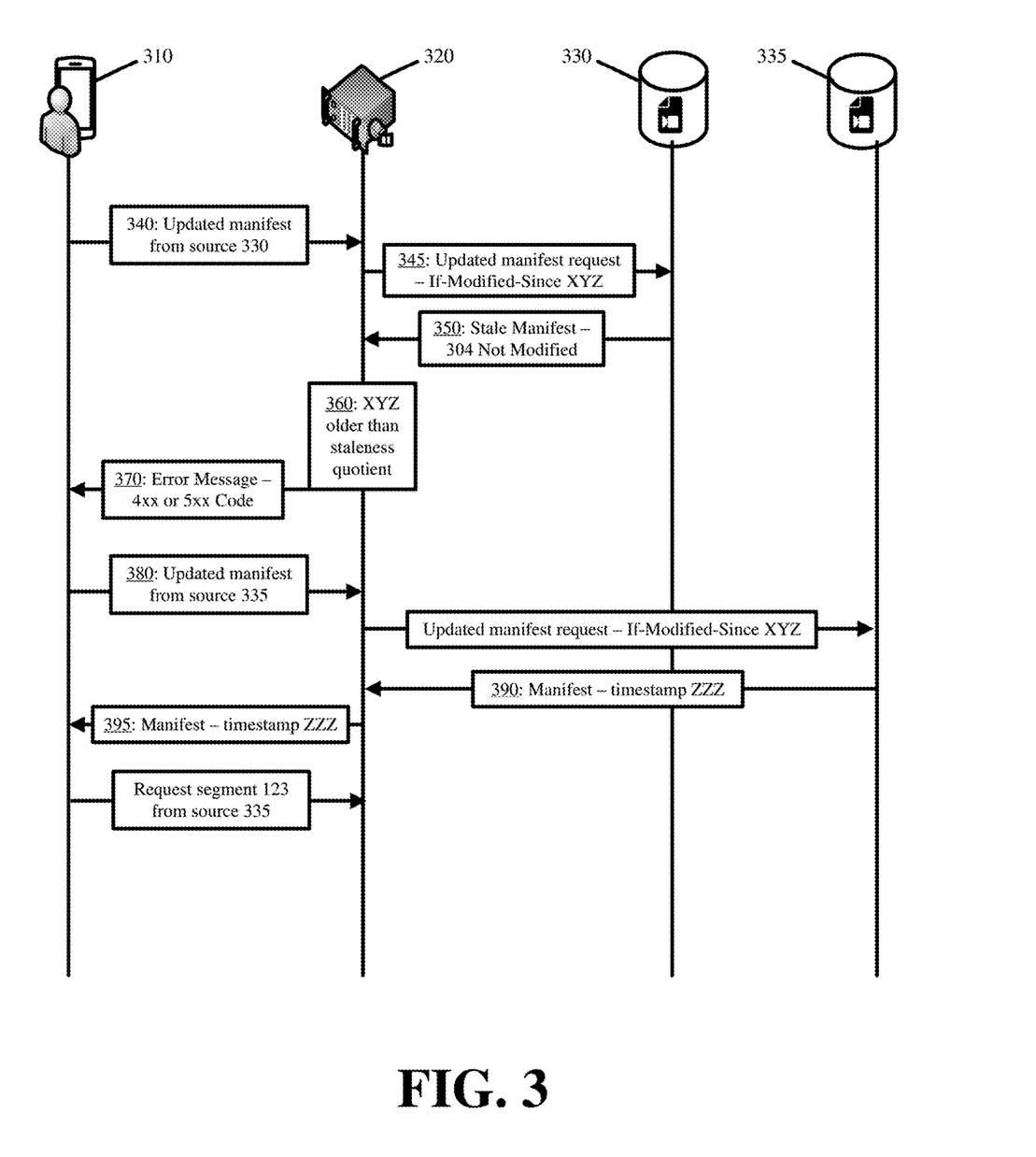
FIG. 3 conceptually illustrates operation of the server assisted live stream failover in accordance with some embodiments.

FIG. 3 conceptually illustrates operation of the server assisted live stream failover in accordance with some embodiments. The figure illustrates messages exchanged between a client 310, the intermediary server 320 performing the server assisted live stream failover in accordance with some embodiments, the first source 330, and the second source 335.

The client 310 directs a request for retrieving an updated manifest of a particular live stream from the first source 330 to the intermediary server 320. Such a request may include a Uniform Resource Locator (URL) with a hostname associated with the intermediary server 320 and a path that identifies or is otherwise associated with the first source 330.

The request routes (at 340) to and is received by the intermediary server 320. The intermediary server 320 attempts to retrieve (at 345) the updated manifest from the first source 330 in response to the client request.

The first source 330 responds (at 350) to the intermediary server 320 with a stale message. In some embodiments, the stale message is an HTTP message with a 304 status code. Such a stale message is sent by the first source 330 when the request from the intermediary server 320 is a conditional request that includes an "If-Modified-Since" header and/or an "If-None-Match" header. The "If-Modified-Since" header contains a timestamp of the last manifest retrieved and cached by the intermediary server 320 from the first source 330, and if the timestamp in the "If-Modified-Since" header is equal to or more current than the timestamp of the manifest that is stored by the first source 330, then there has been no new updates to the manifest last retrieved by the intermediary server 320. The "If-None-Match" request header contains a value equal to a previously retrieved manifest Etag value. If this value matches the latest available manifest Etag value, then there has been no update to the manifest until this time.

In response to the stale message, the intermediary server 320 determines (at 360) whether the last update to the manifest occurred past a threshold amount of time. In particular, the intermediary server 320 compares the timestamp of the last retrieved manifest against a configurable staleness quotient.

If the timestamp of the last manifest update does not exceed the staleness quotient, the intermediary server 320 forwards (not shown) the stale message to the client 310. Such a response will cause the client 310 to reissue the request (not shown) for the updated manifest from same first source 330.

In FIG. 3, the timestamp of the last manifest update is shown to exceed the staleness quotient. In this case, the intermediary server 320 sends (at 370) an error message instead of the stale message in response to the client 310 request originally submitted at step 340. For instance, the intermediary server 320 sends an HTTP message with a 404 Not Found error code.

The error message causes the client 310 to failover from the first source 330 to the second source 335. In some embodiments, the client 310 fails over from the first source 330 to the second source 335 by querying the last received manifest for a link or addressing of the second source 335. The client 310 then issues (at 380) the request for the updated manifest from the second source 335 instead of the first source 330 identified in the original request at 340. The request for the updated manifest from the second source first routes to the same intermediary 320 server or a different intermediary server.

The intermediary server 320 is then able to retrieve (at 390) the updated manifest from the second source 335 provided that the stale message sent by the first source 330 is due to an error that is isolated to the encoder publishing to the first source 330 or the network connectivity of the encoder to the first source 330, and is not an error affecting the encoder publishing to the second source 335 or the network connectivity of the encoder to the second source 335. The second source 335 returns the updated manifest when the manifest that is stored to the second source 335 contains a newer timestamp than the timestamp included in the If-Modified-Since header of the request passed from the intermediary server 320. The intermediary forwards (at 395) the updated manifest to the client 310 and the client continues by directing to the intermediary server 320, requests for segments of the particular live stream from the second source 335.

The error message is provided to the client 310 at step 370 instead of the first source provided stale message when the intermediary server 320 indirectly performs the failover for the client 310. In some embodiments, the intermediary server 320 directly performs the failover for the client 310. In some such embodiments, the intermediary server 320 sends a redirect message to the client 310 with the redirect message containing addressing or a URL identifying the second source 335 as the new source from which to request the particular live stream. The redirect message causes the client 310 to reissue the request to the second source 335.

Figure 4:
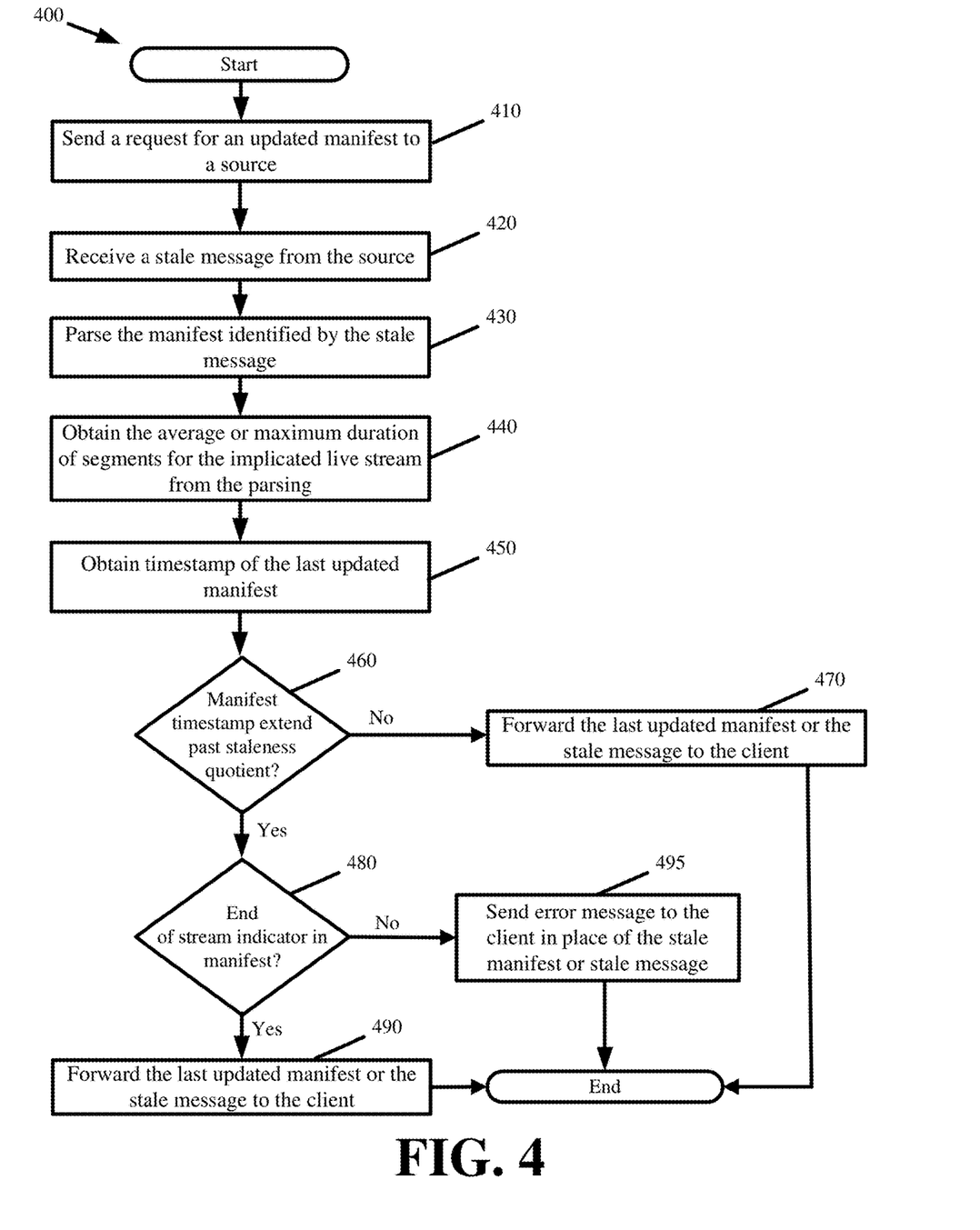
FIG. 4 presents a process for detecting a stale manifest that triggers the server assisted live stream failover in accordance with some embodiments.

FIG. 4 presents a process 400 for detecting a stale manifest that triggers the server assisted live stream failover in accordance with some embodiments. The process 400 is performed by an intermediary server.

The process commences by sending (at 410) a request for an updated manifest to a source. In some embodiments, the request includes an "If-Modified-Since" header field identifying the timestamp of the last manifest retrieved from the source and/or "If-None-Match" header field with a value equal to an ETag (entity-tag) value of the last retrieved manifest.

The process continues upon receiving (at 420) a stale message from the source. The stale message indicates that the manifest identified by the "If-Modified-Since" and/or "If-None-Match" header field of the request has not been updated. This indication is typically provided by the 304 Not Modified status code in the stale message header.

The process parses (at 430) the manifest retrieved from the cache or received via a subrequest after receiving the stale message. In parsing the stale manifest, the process obtains (at 440) the average or maximum duration of segments for the implicated live stream. In the case of the HTTP Live Streaming (HLS) specification, the maximum segment duration is available as a value of the "#EXT-X-TARGET-DURATION" tag. In some embodiments, the intermediary server derives the average segment duration from timing information associated with segments identified in the manifest. For instance, the average duration of a segment can be computed based on the difference in start times of two consecutive segments.

The process also obtains (at 450) the timestamp of the manifest. In some embodiments, the intermediary server obtains the manifest timestamp from the stale message header. In particular, the "Last-Modified" header field of the stale message provides the timestamp. In some other embodiments, the intermediary server provides the timestamp in the "If-Modified-Since" header field of the request sent to the source or is obtained from a copy of the manifest cached by the intermediary server.

The process compares (at 460) the manifest timestamp against a staleness quotient. More specifically, the comparison involves determining whether the difference between a current timestamp and the manifest timestamp is greater than the staleness quotient. In some embodiments, the staleness quotient is set as two times the average segment duration. This staleness quotient provides sufficient time for the source to recover from a temporary error without significantly interrupting client playback of the live stream, but also provides sufficient time for the client to failover to a different source should the problem persistent at the original source. In particular, the client requests some number of segments ahead of its current playback position. The next segments are prefetched and buffered at the client. Should there be a problem in requesting updated manifests or segments, the client can continue playback from the buffered segments. By setting the staleness quotient to be two times the average segment duration, a client that buffers three segments ahead of its current playback position should be able to complete the failover to a new source without exhausting the segment buffer and without interruption to the live stream playback.

In response to the timestamp of the last updated manifest not being older than the staleness quotient, the process forwards (at 470) the last updated manifest or the stale message to the client. Forwarding of the last updated manifest or the stale message does not initiate failover and the client will simply reissue the request to the same source.

In response to the timestamp of the last updated manifest being older than the staleness quotient, the process further queries (at 480) the manifest for an end of stream indicator. In the HLS specification, the end of stream indicator is the "#EXT-X-ENDLIST" tag in the manifest. The end of stream indicator signals that the live stream has ended and there are no further updates to the manifest.

In response to detecting the end of stream indicator, the process again forwards (at 490) the last updated manifest or the stale message to the client. In some embodiments, the process sends a different message to notify the client that the stream has ended and that playback should cease.

In response to not detecting the end of stream indicator and the timestamp of the last updated manifest being older than the staleness quotient, the process substitutes and sends (at 495) an error message to the client in place of the stale manifest or stale message. As before, the error message causes the client to failover and select a different source from which to request the updated manifests and stream segments. The client performs the failover while rendering segments that have been previously retrieved and buffered so as to minimize playback interruption.

In some embodiments, the intermediary server retrieves and caches updated copies of a stream manifest for one client in order to respond to requests from other clients. Should the source from which a manifest is retrieved become subsequent inaccessible, the intermediary server can perform process 400 internally. In other words, the intermediary server can determine staleness of the cached manifest by performing steps 430-490 based on information obtained from the cached manifest and without the source sending the stale message.

In some instances, the manifests provided to the clients lack the failover information. In particular, the manifests do not include the links or addressing for two or more sources. This may occur when different encoders are used to publish manifests and live stream segments to different sources and the encoders operate independent of one another. In such cases, the client will not have the necessary information to failover from one source to another in response to the intermediary server provided error message.

To provide failover in such circumstances, some embodiments dynamically generate manifests or modify manifests obtained from different sources with links to failover sources when the manifests obtained from the original sources do not provide links to the corresponding source and at least one failover source. The generated or modified manifest with at least one added failover source is passed from the intermediary server of some embodiments to a client in place of the original manifest identifying a single source provided by the original source.

Figure 5:
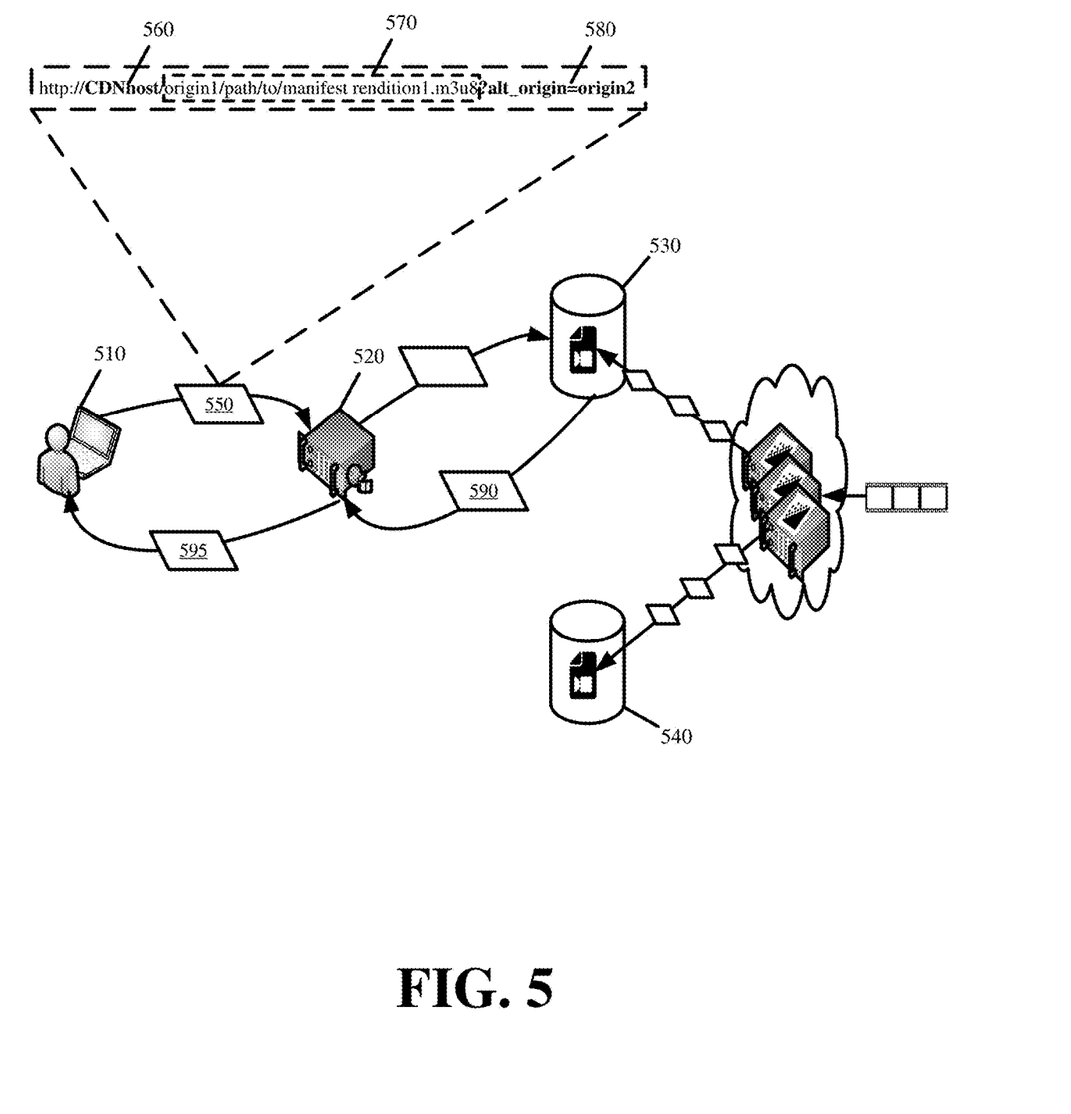
FIG. 5 conceptually illustrates dynamically generating a manifest with redundant sources in accordance with some embodiments.

FIG. 5 conceptually illustrates dynamically generating a manifest with redundant sources in accordance with some embodiments. The figure illustrates a client 510, the intermediary server 520 of some embodiments, a first source 530, and a second source 540. The first and second sources 530 and 540 receive objects of the same live stream including updated manifests and segments of the live stream from one or more encoders under control of a live stream provider.

The client 510 issues a request 550 to the intermediary server 520. The request 550 is for an updated manifest from the first source 530. The request 550 contains an enhanced URL. The enhanced URL includes a hostname 560 associated with the intermediary server 520 and a path 570 for requesting the updated manifest from the first source 530. The enhanced URL also includes a query string parameter 580. The query string parameter 580 specifies a link or addressing to the second source 540. The live stream provider or distributed platform (distributing the live stream on behalf of the live stream provider) issues the enhanced URL when the one or more encoders publishing the live stream to the first and second sources 530 and 540 do not generate manifests with the failover links. Clients request the same live stream using the enhanced URL.

In response to the request 550, the intermediary server 520 requests the updated manifest from the first source 530. The first source 530 returns an original manifest 590. The intermediary server 520 parses the original manifest 590 and detects that the first source 530 is the only source identified in the manifest 590. In other words, the intermediary server 520 determines that no failover sources are identified in the manifest 590.

The intermediary server 520 produces a modified manifest 595 from the original manifest 590 before responding to the client request 550. In particular, the intermediary server 520 extracts the query string parameter 580 that specifies the link or addressing to the second source 540 from the enhanced URL provided as part of the client request 550. The intermediary server 520 then adds the failover link to the second source 540 into the original manifest 590. The modified manifest 595 is then passed from the intermediary server 520 to the client 510 in place of the original manifest 590 provided by the first source 530. Should the intermediary server 520 then trigger failover by passing the error message to the client 510, the client 510 can complete the failover and switch to the second source 540 that the intermediary server 520 dynamically adds to the original manifest 590 and is present in the modified manifest 595.

Figure 6:
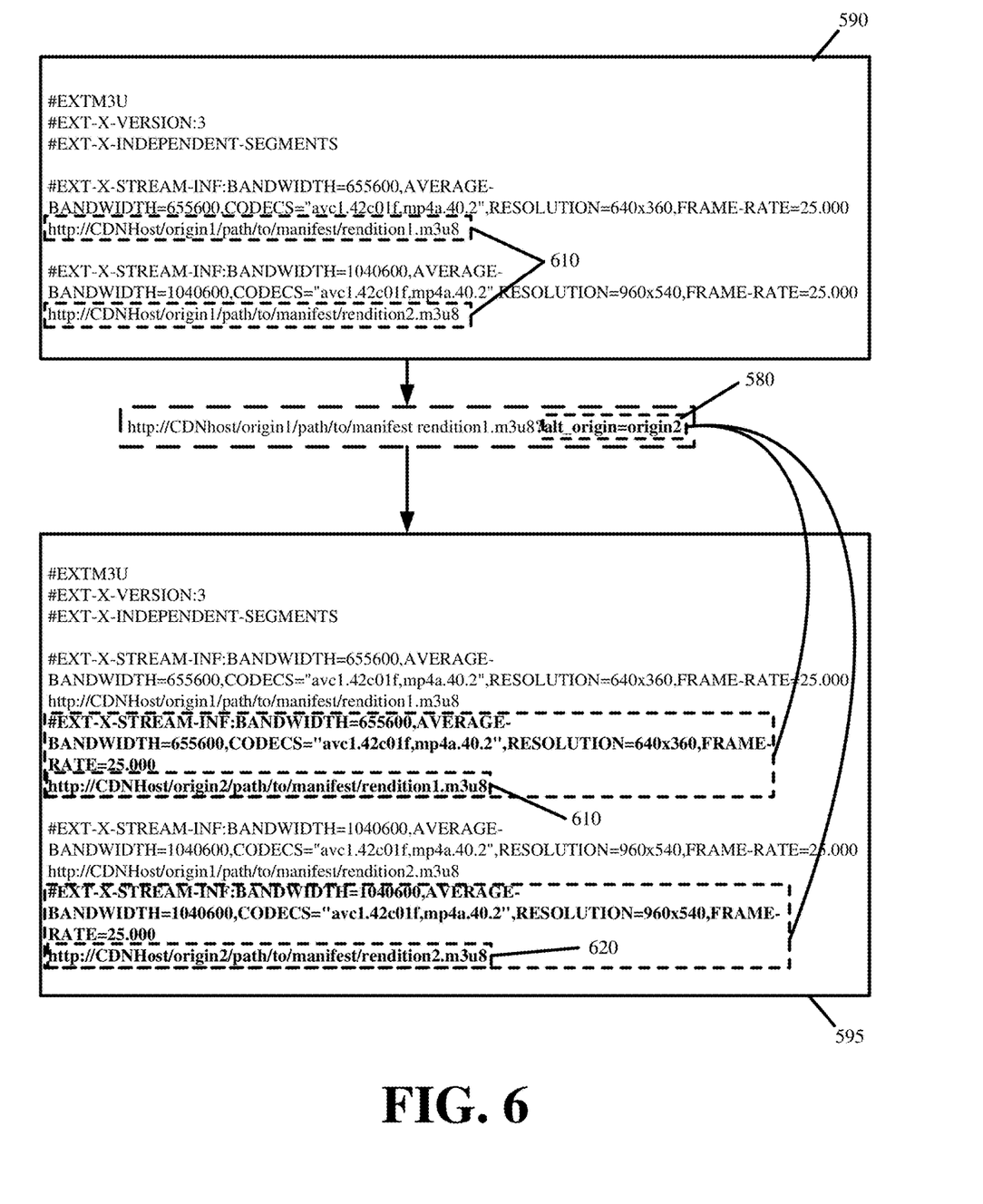
FIG. 6 illustrates exemplary excerpts from the original manifest and the modified manifest of FIG. 5.

FIG. 6 illustrates exemplary excerpts from the original manifest 590 and the modified manifest 595 of FIG. 5. As noted above, the original manifest 590 is the manifest that the intermediary server receives from an origin or other source to which an encoder publishes manifest and segments of a live stream. The modified manifest 595 is the manifest that the intermediary server sends to a client after modifying the original manifest to include additional alternative sources from which the client can access the manifests and segments of the live stream. The addition of the alternative sources is based on the client request enhanced URL, and more specifically, the one or more query string parameters 580 of the enhanced URL.

As can be seen, the original manifest 590 includes links 610 identifying only a first source from which a live stream is available at different quality settings. The modified manifest 595 includes links 610 and 620 to two different sources for each quality setting. More specifically, each quality setting is defined with the first link 610 and a second link 620. The first link 610 identifies the first source. The second link 620 identifies the different second source as a first failover source for the same live stream at the corresponding quality setting. Additional sources can be dynamically added to the modified manifest 595 by the intermediary server when specified in the enhanced URL query string parameters.

Some embodiments further include a live stream indicator as part of the enhanced URL. The live stream indicator is a query string parameter. The live stream indicator specifies that the implicated stream is a live stream and that the server assisted live stream failover processes identified above should be performed. In particular, the intermediary server receiving the request with the live stream indicator performs the dynamic manifest generation. The intermediary server also initiates or triggers failover in response to detecting a stale manifest. The live stream indicator can be a query string argument such as "live=1".

The error messages that the intermediary server generates in response to the stale messages received from the sources indirectly redirect a client from one source to another. Some embodiments directly redirect the client from one source to another in response to detecting a stale manifest that triggers failover. In some such embodiments, the intermediary server does not respond to a client request with an error message, but instead passes a redirect message to the client. In particular, the intermediary server may pass an HTTP message with a 302 status code. The redirect message further includes a link or addressing to the alternate source that the client is redirected to. In some embodiments, the link or address to alternate source is provided in the Location header field of the HTTP response with status code being 302. The intermediary server may obtain the link to the alternate source from the stale manifest or a query string parameter provided with the enhanced URL of the client request. Accordingly, the intermediary server can perform the steps identified in FIG. 5. However, the step of sending the modified manifest from the intermediary server to the client in FIG. 5 is replaced with a step for sending the redirect message with the link to the alternate source.

In some embodiments, the intermediary server avoids client redirection (indirect or direct) altogether. In some such embodiments, the intermediary server retrieves an updated manifest from an alternate second source when the first source identified in a client issued request is inaccessible or provides a stale manifest that triggers the failover. In response to unsuccessfully retrieving the updated manifest from the first source and then successfully retrieving the updated manifest from the second source, the intermediary server provides the updated manifest from the second source to the client.

The intermediary server automatically retrieves the manifest from the alternate source by generating a subrequest to the second source in response to the original request to the first source resulting in the stale manifest that exceeds the configured staleness quotient. The subrequest is generated without any action by the client. The link or addressing for the subrequest to the second source can again be obtained from a query string parameter included with the enhanced URL of the original client request. Alternatively, the intermediary server can obtain the link or addressing to the second source used for the subrequest from the stale manifest if the stale manifest specifies the alternate second source.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
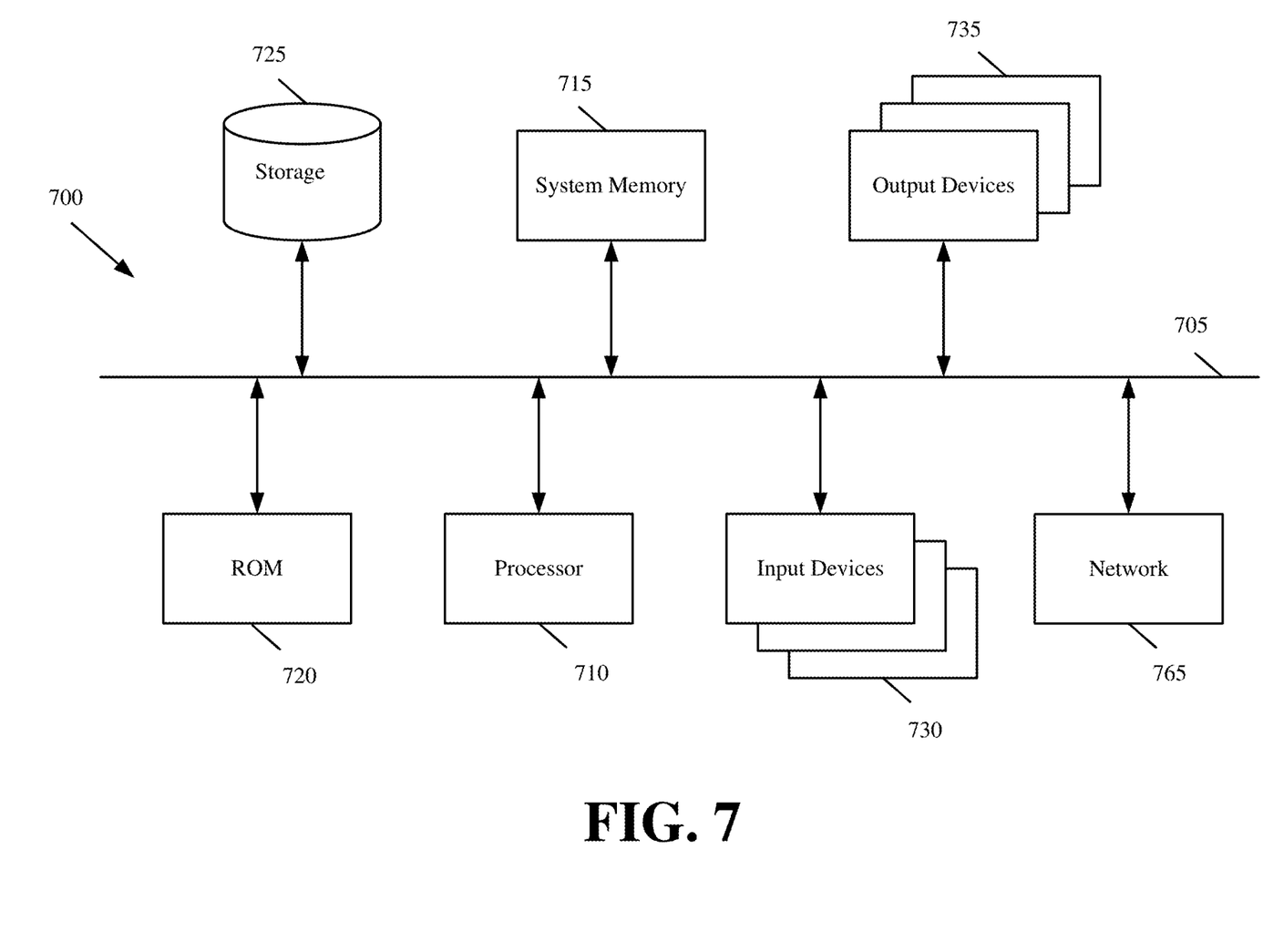
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the various methods and machines described above (e.g., intermediary server, source, etc.). Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device. Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices. The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
receiving a request for an object of a media stream from a client at a stream distribution server;
requesting, by the stream distribution server, the object from a first source on behalf of the client;
receiving a stale message from the first source at the stream distribution server, the stale message comprising an object timestamp of when said object was last updated;
determining a playback duration of one or more segments of the media stream;
deriving a staleness quotient from the playback duration of the one or more segments; and
controlling, with the stream distribution server, continued retrieval of the media stream from the first source or failover retrieval of the media stream from a different second source based on (i) the staleness quotient and (ii) a difference between the object timestamp and a current timestamp, wherein said controlling comprises:
initiating a retry of the request for the object from the first source, without failing over to the second source, based on the difference between the object timestamp and the current timestamp not exceeding the staleness quotient; and
initiating failover of the media stream from the first source to the different second source by issuing the request for the object to the second source instead of the first source based on the difference between the object timestamp and the current timestamp exceeding the staleness quotient, wherein objects of the media stream are redundantly accessible from the first source and the second source.

2. The method of claim 1, wherein said initiating the failover comprises sending an error message, that is different than the stale message, from the stream distribution server to the client based on the difference between the object timestamp and the current timestamp exceeding the staleness quotient.

3. The method of claim 2, wherein said initiating the retry comprises sending said stale message from the stream distribution server to the client based on the difference between the object timestamp and the current timestamp not exceeding the staleness quotient.

4. The method of claim 3, wherein said client retries the request for said object from the first source in response to said sending of said stale message, and wherein said client initiates a new request to obtain the object from the second source in response to said sending of said error message.

5. The method of claim 2, wherein the stale message comprises a HyperText Transfer Protocol (HTTP) message with a 3xx status code, and the error message comprises a HTTP message with 4xx or 5xx status code.

6. The method of claim 1, wherein the difference between the object timestamp and the current timestamp exceeds said staleness quotient when said difference is at least greater than the playback duration.

7. The method of claim 1 further comprising extracting the object timestamp from a Last-Modified header field of the stale message.

8. The method of claim 1, wherein said object is a manifest of said media stream, said manifest listing a set of segments of the media stream.

9. A method comprising:
inspecting an object of a particular media stream that is obtained from a first source;
determining that the object has not been updated from an earlier retrieved first instance to an updated second instance of the object based on a first timestamp of the object being associated with the earlier retrieved first instance of the object;
determining a playback duration of at least one segment of the particular media stream;
retrying retrieval of the second instance of the object with a different second timestamp from the first source, without failing over to a different second source for the particular media stream, in response to determining that the object has not been updated from the first instance to the second instance, and further in response to a difference between the first timestamp and a current timestamp being less than the playback duration of at least one segment of the particular media stream; and
failing over retrieval of the second instance of the object with the second timestamp from the first source to a different second source in response to determining that the object has not been updated from the first instance to the second instance, and further in response to the difference between the first timestamp and the current timestamp being greater than the playback duration of the at least one segment of the particular media stream, wherein said failing over comprises retrieving the second instance of the object with the second timestamp from the second source.

10. The method of claim 9, wherein said retrying comprises (i) passing a stale message to a client requesting the object, and (ii) requesting the second instance of the object with the second timestamp from the first source based on said client resubmitting a request directed to the first source in response to said passing of the stale message.

11. The method of claim 10, wherein said failing over comprises (i) passing an error message to said client, and (ii) requesting the second instance of the object with the second timestamp from the second source based on said client issuing a request directed to the second source in response to said passing of the error message.

12. The method of claim 9, wherein the object is one of a manifest or segment of a media stream.

13. A method comprising:
receiving an original manifest of a media stream, said original manifest comprising a first source from which a plurality of segments of the media stream are accessible, wherein each segment of the plurality of segments encodes some duration of said media stream;
inspecting said original manifest, wherein said inspecting comprises identifying a timestamp of when said original manifest was last updated;
passing said original manifest to a client in response to a difference between said timestamp of the original manifest and a current timestamp being less than a playback duration of one or more of the plurality of segments; and
passing a modified manifest with a new Uniform Resource Locator ("URL") that is not present in the original manifest and that is directed to a different second resource in response to said difference being greater than the playback duration of one or more of the plurality of segments, wherein passing the modified manifest comprises adding the new URL to the original manifest, and to identify the second source as at least one alternate source from which the plurality of segments are accessible.

14. The method of claim 13 further comprising receiving a request directed to the first source from the client, said request comprising a query string parameter identifying the alternate second source.

15. The method of claim 14 further comprising generating the modified manifest by extracting an identifier for the second source from said query string parameter of the request.

16. The method of claim 13 further comprising triggering failover of said client from the first source to the alternate second source in response to said difference being greater than the playback duration of one or more of the plurality of segments, wherein said triggering comprises said passing of the modified manifest with an error message to said client.

* * * * *